United States Patent
Kim et al.

(10) Patent No.: US 7,446,830 B2
(45) Date of Patent: Nov. 4, 2008

(54) METHOD FOR ALIGNING POLYMER NETWORK LIQUID CRYSTAL

(75) Inventors: Mi Sook Kim, Jeollabuk-do (KR); Sung Hun Song, Kyoungki-do (KR); Seung Hee Lee, Jeollabuk-do (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 36 days.

(21) Appl. No.: 11/489,093

(22) Filed: Jul. 19, 2006

(65) Prior Publication Data

US 2006/0256258 A1    Nov. 16, 2006

Related U.S. Application Data

(62) Division of application No. 10/882,505, filed on Jun. 30, 2004, now Pat. No. 7,102,706.

(30) Foreign Application Priority Data

Mar. 17, 2004    (KR) ................................ 2004-18075

(51) Int. Cl.
*G02F 1/1333* (2006.01)
(52) U.S. Cl. ........................................................ 349/93
(58) Field of Classification Search ................ 349/93
See application file for complete search history.

(56) References Cited

U.S. PATENT DOCUMENTS

| | | | | |
|---|---|---|---|---|
| 5,189,540 A | * | 2/1993 | Nakamura et al. | 349/88 |
| 6,529,252 B2 | * | 3/2003 | Nakao et al. | 349/86 |
| 6,642,992 B2 | * | 11/2003 | Kim | 349/191 |

FOREIGN PATENT DOCUMENTS

| | | |
|---|---|---|
| KR | 100163894 | 9/1998 |
| KR | 1998-35624 | 3/1999 |
| KR | 2001-0068994 | 7/2001 |
| KR | 2001-0096160 | 11/2001 |

* cited by examiner

*Primary Examiner*—James A Dudek
(74) *Attorney, Agent, or Firm*—Ladas & Parry LLP

(57) ABSTRACT

Disclosed is a method for aligning polymer network liquid crystal. In the method, alignment of liquid crystal in a bulk state is controlled by means of an orientation power of polymer material itself which is formed by irradiating linearly polarized ultraviolet rays to monomer material having an orientation power, thereby achieving a transparent state at an initial state without an orientation layer. That is, Linearly polarized ultraviolet rays are irradiated to ultraviolet-hardening type monomers having an orientation power. Alignment of liquid crystal of a bulk state is controlled while the monomers are changed to polymers, thereby achieving an initial transparent state. The molecules of the liquid crystal are placed in disorder by a vertical electric field and the horizontal orientation power of a polymer chain.

2 Claims, 3 Drawing Sheets

(a)

(b)

(c)

METHOD FOR ALIGNING POLYMER NETWORK LIQUID CRYSTAL

This application is a divisional application of U.S. application Ser. No. 10/882,505, filed Jun. 30, 2004 which issued as U.S. Pat. No. 7,102,706 on Sep. 5, 2006, and which the applicant claims the filing date priority benefit of.

BACKGROUND OF THE INVENTION

1. Field of the Invention

The present invention relates to a method for aligning polymer network liquid crystal, and more particularly to a method for aligning a normally transparent alignment free (NTAF) polymer network liquid crystal (PNLC) which can realize a transparent state at an initial state without an orientation layer, by controlling alignment of liquid crystal in a bulk state by means of an orientation power of polymer material itself which is formed by irradiating linearly polarized ultraviolet rays to monomer material having an orientation power.

2. Description of the Prior Art

A scattering mode liquid crystal display realizes a display through phase separation between polymers and liquid crystal, and is applied to various fields including projections and switchable windows. However, according to a reverse-type scattering mode liquid crystal display having an initial state of transparency, initial alignment of liquid crystal is controlled by an orientation layer, so that an orientation layer coating step and a rubbing step are required in addition to a process of fabricating the conventional scattering mode liquid crystal display.

Therefore, the scattering mode liquid crystal display has a complicated fabrication process since two additional steps are required. In addition, in the scattering mode liquid crystal display, since light orientation using irradiation of ultraviolet rays is employed in the rubbing step, rubbing cloth may cause static electricity and mura in the rubbing step, thereby reducing the yield.

SUMMARY OF THE INVENTION

Accordingly, the present invention has been made to solve the above-mentioned problems occurring in the prior art, and an object of the present invention is to provide a PNLC (Polymer Network Liquid Crystal) alignment method which does not require steps of coating and rubbing an orientation layer.

In order to accomplish this object, there is provided a method for aligning polymer network liquid crystal, the method comprising the steps of: irradiating linearly polarized ultraviolet rays to ultraviolet-hardening type monomers which have an orientation power; controlling alignment of liquid crystal in a bulk state, while the ultraviolet-hardening type monomers are changed to polymers according to the irradiation of the linearly polarized ultraviolet rays, thereby achieving an initial transparent state; and placing molecules of the liquid crystal in disorder by means of a vertical electric field and a horizontal orientation power of a polymer chain, the vertical electric field being formed between upper and lower electrodes by an applied voltage.

In accordance with another aspect of the present invention, there is provided a method for aligning polymer network liquid crystal, the method comprising the steps of: irradiating linearly polarized ultraviolet rays to ultraviolet-hardening type monomers which have an orientation power; controlling alignment of liquid crystal of a bulk state while the ultraviolet-hardening type monomers are changed to polymers depending on the irradiation of the linearly polarized ultraviolet rays, and achieving an initial transparent state, which is a dark state, by a first and a second polarization plate adhering to an upper electrode and a lower electrode, respectively; and applying a voltage to form an electric field between the upper and lower electrodes, the electric field aligning molecules of the liquid crystal having a positive dielectric anisotropy in one direction, thereby achieving a white state.

In accordance with still another aspect of the present invention, there is provided a method for aligning polymer network liquid crystal, the method comprising the steps of: irradiating linearly polarized ultraviolet rays to ultraviolet-hardening type monomers which have an orientation power; controlling alignment of liquid crystal of a bulk state while the ultraviolet-hardening type monomers are changed to polymers according to the irradiation of the linearly polarized ultraviolet rays, and achieving an initial transparent state, which is a dark state, by a polarization plate located on an upper electrode and a reflection plate located below a lower electrode; and applying a voltage to form an electric field between the upper and lower electrodes, the electric field aligning molecules of the liquid crystal having a positive dielectric anisotropy in one direction, thereby achieving a white state.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
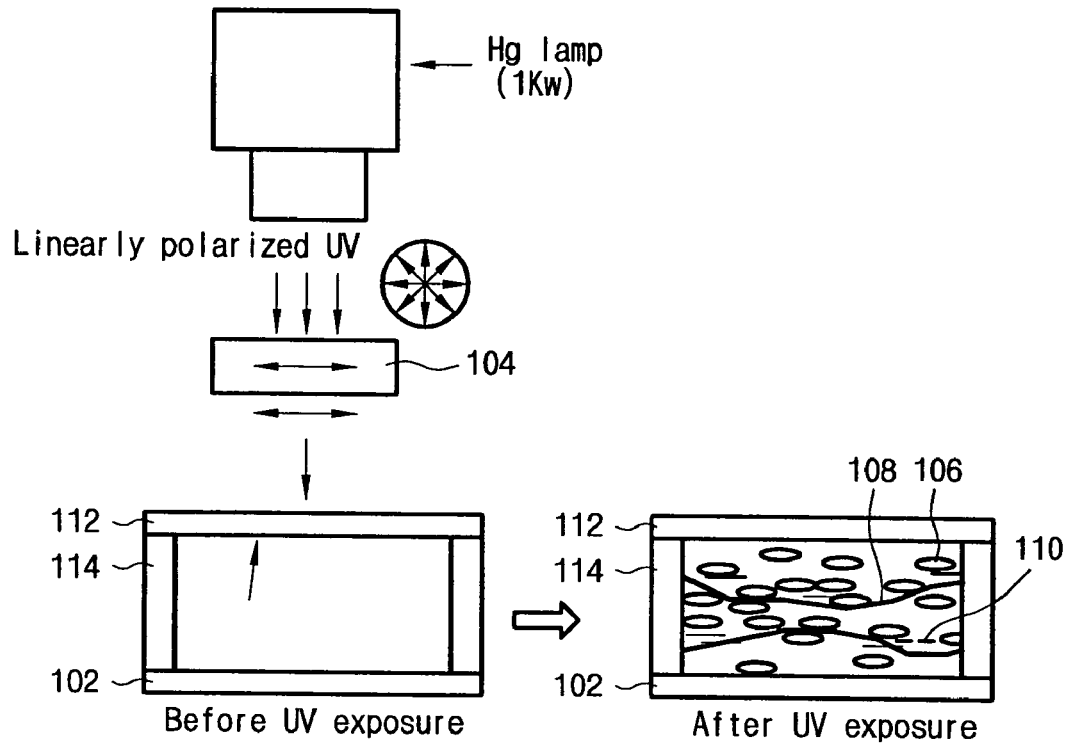
FIG. 1 is a view showing an ultraviolet rays irradiation step and an initial transparent state realizing step in an NTAF PNLC (Normally Transparent Alignment Free Polymer Network Liquid Crystal) alignment method according to a first embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

FIG. 1 is a view showing an ultraviolet rays irradiation step and an initial transparent state realizing step in an NTAF (Normally Transparent Alignment Free) PNLC (Polymer Network Liquid Crystal) alignment method according to a first embodiment of the present invention.

As shown in FIG. 1, a mixture of ultraviolet-hardening type monomers 104 having an orientation power and liquid crystal 106 is disposed on a lower electrode 102, with a spacer 114 formed. Then, the mixture is covered with an upper plate and linearly polarized ultraviolet rays are irradiated to the mixture.

Figure 3:
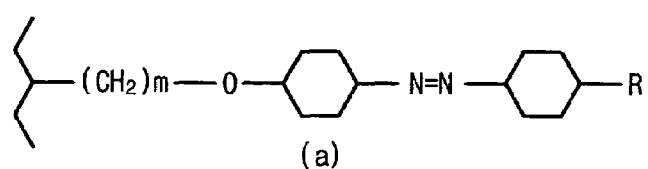
FIG. 3 shows chemical formulas of examples of ultraviolet-hardening type monomers which may be utilized in embodiments according to the present invention.
Figure 3:
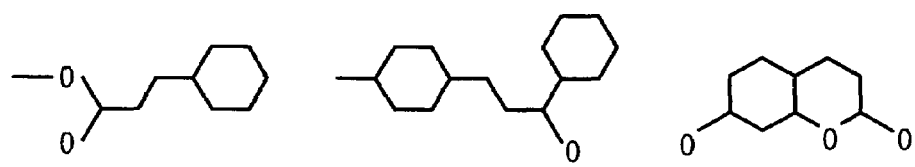
Figure 3:
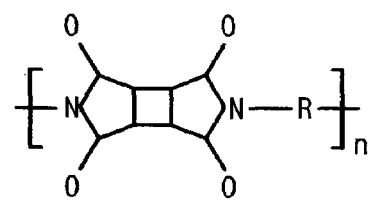
Figure 3:
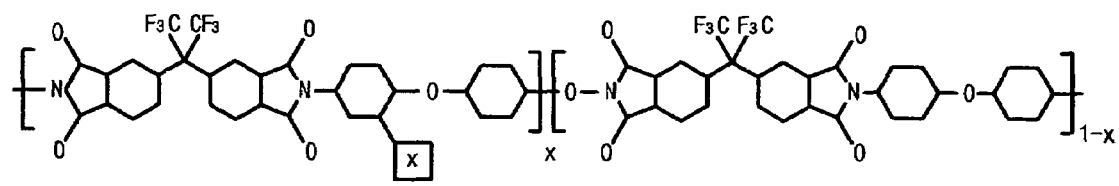

FIG. 3 shows chemical formulas of examples of ultraviolet-hardening type monomers which may be utilized in embodiments according to the present invention.

As shown in FIG. 3, it is preferred that the ultraviolet-hardening type monomers 104 includes either polyimide-based material or acrylate-based material. While the linearly polarized ultraviolet rays are being irradiated, a free tilt angle formed by a polymer chain 110 is controlled by adjusting temperature and power in the exposure step. While such a step is being performed, the exposure temperature is controlled within a range between 30 to 80° C., the ultraviolet-hardening type monomers 104 are polymerized, and simultaneously a solvent, in which the ultraviolet-hardening type monomers 104 have been dissolved, is evaporated.

While the ultraviolet-hardening type monomers 104 are changed to polymers 108 according to the irradiation of the linearly polarized ultraviolet rays, an initial transparent state is achieved by controlling the alignment of the liquid crystal of a bulk state. Preferably, refractive indexes of short axes of the molecules of the liquid crystal 106 and the ultraviolet-hardening type monomers 104 are identical to each other, a refractive index anisotropy of the liquid crystal 106 does not exceed 0.15, and the molecules of the liquid crystal 106 and the polymers 108 is horizontally aligned at an initial state.

While the ultraviolet-hardening type monomers 104 are changed to the polymers 108, the polymers are aligned in one direction by the linearly polarized ultraviolet rays. When phases of the polymers 108 and the liquid crystal 106 are separated, the molecules of the liquid crystal of the bulk state are aligned in said one direction by the polymers 108. During this step, the polymer chain 110 is aligned in a predetermined direction according to the irradiation of the linearly polarized ultraviolet rays, so that the alignment of the liquid crystal of the bulk state is controlled. In this case, the polymer chain 110 is dissolved by the irradiation of the linearly polarized ultraviolet rays, and the liquid crystal 106 is aligned at a position where the dissolved polymers have been dissolved, so that the initial transparent state is achieved.

Figure 2:
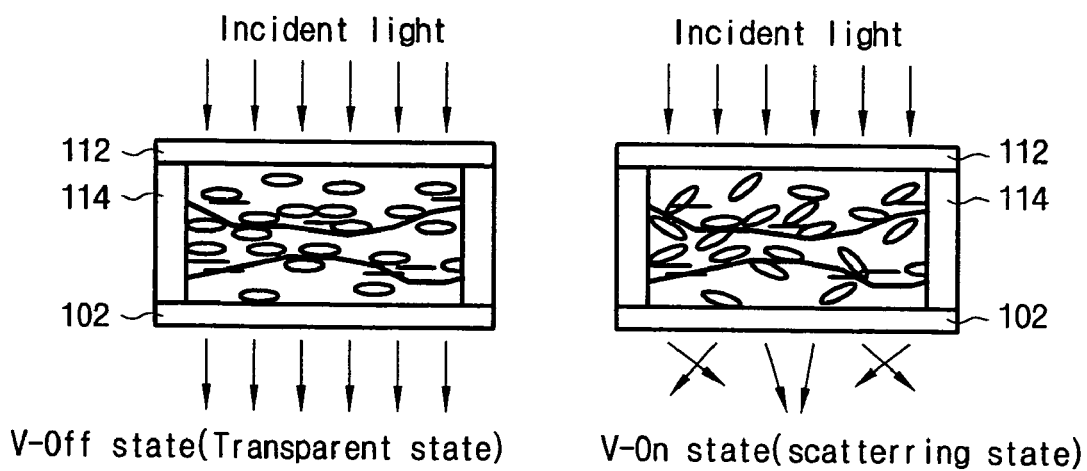
FIG. 2 is a view showing a step of liquid crystal alignment according to application of a voltage in the NTAF PNLC alignment method according to a first embodiment of the present invention.

FIG. 2 is a view showing a step of liquid crystal alignment according to application of a voltage in the NTAF PNLC alignment method according to a first embodiment of the present invention.

When a voltage is applied to the liquid crystal 106, the applied voltage forces the liquid crystal 106 having a positive dielectric anisotropy to be vertically aligned according to the direction of an electric formed field by the applied voltage, while the orientation power of the polymers 108 located in the horizontal direction forces the liquid crystal 106 to maintain an initial horizontal state. Accordingly, the molecules of the liquid crystal 106 are placed in all directions. That is, the molecules of the liquid crystal 106 are placed in disorder by a vertical electric field and the orientation power of the polymer chain 110 located in the horizontal direction, in which the vertical electric field is formed between an upper electrode 112 and the lower electrode 102 according to the applied voltage. Consequently, scattering occurs due to a refraction index difference between the polymers 108 and the liquid crystal 106.

Hereinafter, a method of aligning transmission-type polymer network liquid crystal according to a second embodiment of the present invention will be described with reference to FIG. 4.

Figure 4:
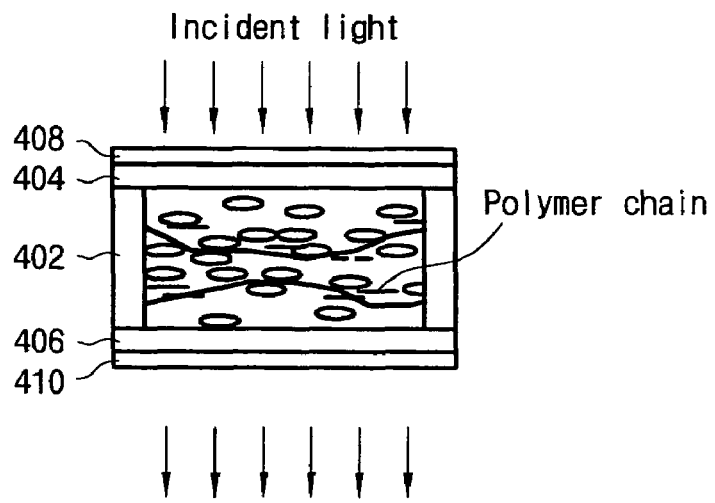
FIG. 4 is a view showing a method of aligning transmission-type polymer network liquid crystal according to a second embodiment of the present invention.

FIG. 4 is a view showing a method of aligning transmission-type polymer network liquid crystal according to a second embodiment of the present invention.

Linearly polarized ultraviolet rays are irradiated to ultraviolet-hardening type monomers having an orientation power. Liquid crystal of a bulk state is controlled to be aligned while the ultraviolet-hardening type monomers are changed to polymers according to the irradiation of the linearly polarized ultraviolet rays, and an initial transparent state establishing a dark state is achieved by a first and a second polarization plate 408 and 410 adhering to an upper electrode 404 and a lower electrode 406, respectively.

When a voltage is applied to the upper electrode 404 and the lower electrode 406, molecules of the liquid crystal having a positive dielectric anisotropy are aligned in one direction owing to an electric field formed between the electrodes 404 and 406 by the applied voltage, so that a white state is achieved. The first and the second polarization plate 408 and 410 are located on the upper electrode 404 and the lower electrode 406, respectively, with transmission axes of the polarization plates intersecting each other. In addition, a lower rubbing direction and a transmission axis of the lower polarization plate are accorded to each other. Therefore, a dark state is achieved at the initial state and a white state is achieved when a voltage is applied.

Hereinafter, a method of aligning reflection-type polymer network liquid crystal according to a third embodiment of the present invention will be described with reference to FIG. 5.

Figure 5:
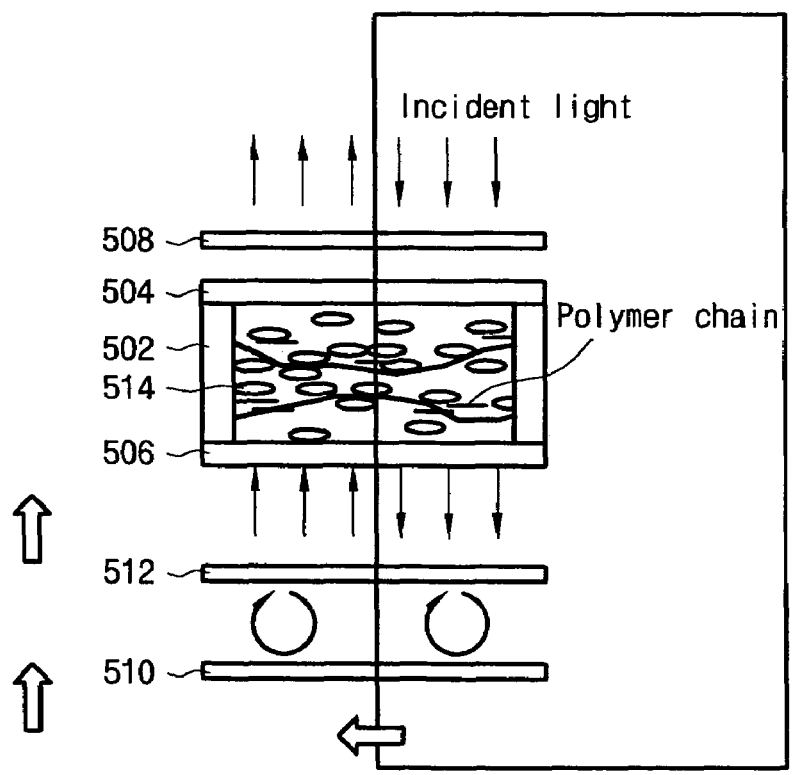
FIG. 5 is a view showing a method of aligning reflection-type polymer network liquid crystal according to a third embodiment of the present invention.

FIG. 5 is a view showing a method of aligning reflection-type polymer network liquid crystal according to a third embodiment of the present invention.

Linearly polarized ultraviolet rays are irradiated to ultraviolet-hardening type monomers having an orientation power. Liquid crystal of a bulk state is controlled to be aligned while the ultraviolet-hardening type monomers are changed to polymers according to the irradiation of the linearly polarized ultraviolet rays, and an initial transparent state establishing a dark state is achieved by a polarization plate 508 located on an upper electrode 504 and a reflection plate 510 located below a lower electrode 506. A $\lambda/4$ film is interposed between the lower electrode 506 and the reflection plate 510, so that the linearly polarized light incident thereto is changed to circularly polarized light.

When a voltage is applied to the electrodes 404 and 406, molecules of the liquid crystal having a positive dielectric anisotropy are aligned in one direction, so that a white state is achieved. Incident light is linearly polarized by the polarization plate 508, and passes through a liquid crystal layer and the $\lambda/4$ film which is a compensation film. After this, the light again passes through the liquid crystal layer by the reflection plate 510 and becomes linearly polarized light twisted by 90° on the basis of the incident light, so that an initial dark state is achieved. When a voltage is applied, the liquid crystal is placed in disorder, thereby causing leakage of light instead of changing the incident light into linearly polarized light twisted by 90°. As a result, a white state is achieved.

As described above, the present invention has a characteristic in which monomers having an orientation power are used for controlling alignment of liquid crystal of a bulk state. That is, ultraviolet-hardening type monomers, which are used for phase separation of the liquid crystal and the monomers, are aligned in one direction according to exposure conditions, such as exposure time and exposure temperature, thereby also serving as an orientation layer. Therefore, according to the present invention, it is possible in a reverse PNLC mode to omit two steps of coating and rubbing an orientation layer. In addition, according to the method of the present invention, it is possible to prevent the generation of static electricity and mura caused by rubbing cloth in a rubbing step, thereby improving the yield.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for aligning polymer network liquid crystal, the method comprising the steps of:

irradiating linearly polarized ultraviolet rays to ultraviolet-hardening type monomers which have an orientation power;

controlling alignment of liquid crystal of a bulk state while the ultraviolet-hardening type monomers are changed to polymers depending on the irradiation of the linearly polarized ultraviolet rays, and achieving an initial transparent state, which is a dark state, by a first and a second polarization plate adhering to an upper electrode and a lower electrode, respectively; and applying a voltage to form a vertical electric field between the upper and lower electrodes, the vertical electric field and horizontal orientation power of a polymer chain aligning molecules of the liquid crystal having a positive dielectric anisotropy in one direction, thereby achieving a white state.

2. The method as claimed in claim 1, wherein, the dark state is achieved by locating the first and the second polarization plate on the upper electrode and the lower electrode, respectively, with transmission axes of the polarization plates intersecting each other.

* * * * *